US010701001B2

(12) United States Patent
Sun et al.

(10) Patent No.: US 10,701,001 B2
(45) Date of Patent: Jun. 30, 2020

(54) WIRELESS COMMUNICATION CIRCUIT WITH SCHEDULING CIRCUIT IN MAC LAYER

(71) Applicant: Realtek Singapore Pte. Ltd., Singapore (SG)

(72) Inventors: Chao-Hai Sun, Singapore (SG); Shun-Fa Chen, Singapore (SG)

(73) Assignee: REALTEK SINGAPORE PTE. LTD., Singapore (SG)

( * ) Notice: Subject to any disclaimer, the term of this patent is extended or adjusted under 35 U.S.C. 154(b) by 44 days.

(21) Appl. No.: 16/116,024

(22) Filed: Aug. 29, 2018

(65) Prior Publication Data

US 2020/0076745 A1    Mar. 5, 2020

(51) Int. Cl.
| H04B 7/00 | (2006.01) |
| H04L 12/861 | (2013.01) |
| H04W 28/06 | (2009.01) |
| H04W 80/02 | (2009.01) |

(52) U.S. Cl.
CPC ........... *H04L 49/90* (2013.01); *H04W 28/065* (2013.01); *H04W 80/02* (2013.01)

(58) Field of Classification Search
CPC ...... H04L 49/90; H04W 80/02; H04W 28/065
See application file for complete search history.

(56) References Cited

U.S. PATENT DOCUMENTS

| 2010/0278062 A1 | 11/2010 | Abraham et al. |
| 2012/0236789 A1 | 9/2012 | Dravida et al. |
| 2019/0116606 A1* | 4/2019 | Chen ..................... H04L 5/0044 |
| 2019/0281638 A1* | 9/2019 | Pelletier ................ H04L 5/0055 |

* cited by examiner

*Primary Examiner* — Bo Hui A Zhu
(74) *Attorney, Agent, or Firm* — McClure, Qualey & Rodack, LLP

(57) ABSTRACT

A wireless communication circuit includes: a physical-layer circuit, arranged to operably communicate with other wireless communication devices through an antenna; a microcontroller, arranged to operably generate data frames to be transmitted to other wireless communication devices; and a MAC-layer circuit comprising: a MAC-layer storage circuit for storing a data queue; a MAC-layer control circuit, coupled with the physical-layer circuit, the micro-controller, and the MAC-layer storage circuit, arranged to temporarily store the data frames generated by the micro-controller in the data queue; and a scheduling circuit, coupled with the MAC-layer storage circuit and the MAC-layer control circuit, arranged to operably schedule a timing that the MAC-layer control circuit transmits data stored in the data queue to the physical-layer circuit.

10 Claims, 3 Drawing Sheets

WIRELESS COMMUNICATION CIRCUIT WITH SCHEDULING CIRCUIT IN MAC LAYER

BACKGROUND

The disclosure generally relates to a wireless communication circuit and, more particularly, to a wireless communication circuit capable of increasing data throughput.

In order to achieve time-division multiple access (TDMA) purpose, many wireless communication circuits adopted the carrier sense multiple access (CSMA) mechanism to be the media access control (MAC) protocol. In a conventional wireless communication circuit, the micro-processor is required to frequently read the registers in the MAC-layer circuit, so that the micro-processor could obtain the data transmission progress of the MAC-layer circuit.

However, the operations of frequently reading the registers in the MAC-layer circuit conducted by the micro-processor would inevitably increase the loading of communication between the micro-processor and the MAC-layer circuit, thereby degrading the overall transmission performance of the wireless communication circuit.

SUMMARY

An example embodiment of a wireless communication circuit is disclosed, comprising: a physical-layer circuit, arranged to operably communicate with other wireless communication devices through an antenna; a micro-controller, arranged to operably generate data frames to be transmitted to other wireless communication devices; and a MAC-layer circuit comprising: a MAC-layer storage circuit for storing a data queue; a MAC-layer control circuit, coupled with the physical-layer circuit, the micro-controller, and the MAC-layer storage circuit, arranged to temporarily store the data frames generated by the micro-controller in the data queue; and a scheduling circuit, coupled with the MAC-layer storage circuit and the MAC-layer control circuit, arranged to operably schedule a timing that the MAC-layer control circuit transmits data stored in the data queue to the physical-layer circuit.

Another example embodiment of a wireless communication circuit is disclosed, comprising: a physical-layer circuit, arranged to operably communicate with other wireless communication devices through an antenna; a micro-controller, arranged to operably generate data frames and corresponding action frames to be transmitted to other wireless communication devices; and a MAC-layer circuit comprising: a MAC-layer storage circuit for storing a data queue and a management queue; a MAC-layer control circuit, coupled with the physical-layer circuit, the micro-controller, and the MAC-layer storage circuit, arranged to temporarily store the data frames generated by the micro-controller in the data queue, and to temporarily store the corresponding action frames generated by the micro-controller in the management queue; and a scheduling circuit, coupled with the MAC-layer storage circuit and the MAC-layer control circuit, arranged to intermittently check contents of the data queue and the management queue, so as to operably schedule a timing that the MAC-layer control circuit transmits data stored in the data queue and the management queue to the physical-layer circuit; and a MAC-layer register, coupled with the MAC-layer control circuit and the micro-controller, arranged to operably store operational status values of the MAC-layer circuit, thereby enabling the micro-controller to be capable of determining the operational status of the MAC-layer circuit; wherein the timing that the MAC-layer control circuit transmits the data stored in the data queue and the management queue to the physical-layer circuit is controlled by the scheduling circuit, not controlled by the micro-controller; and if the scheduling circuit determines that no data in the data queue needs to be transmitted to the physical-layer circuit, the scheduling circuit controls the MAC-layer control circuit to release a network occupation right of the wireless communication circuit to other wireless communication devices before expiration of the network occupation right.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
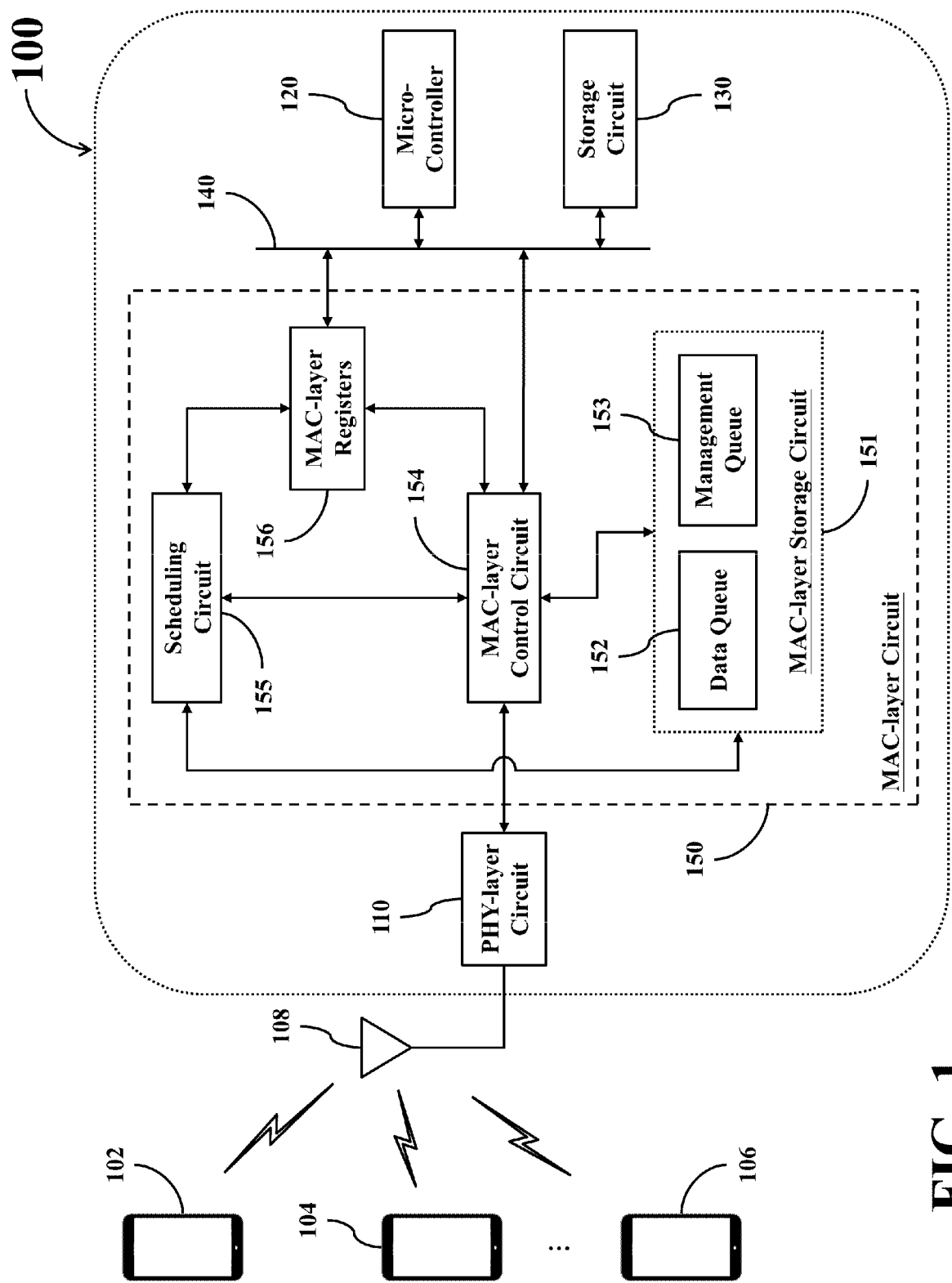
FIG. 1 shows a simplified functional block diagram of a wireless communication circuit according to one embodiment of the present disclosure.

FIG. 1 shows a simplified functional block diagram of a wireless communication circuit 100 according to one embodiment of the present disclosure. The wireless communication circuit 100 is arranged to operably communicate data with multiple wireless communication devices (e.g., the exemplary wireless communication devices 102~106 shown in FIG. 1) through an antenna 108 by using appropriate wireless transmission approach.

The wireless communication circuit 100 adopted the carrier sense multiple access (CSMA) mechanism to be the media access control (MAC) protocol, so as to realize time-division multiple access (TDMA) functionalities. The wireless communication circuit 100 may cooperate with other wireless communication devices 102~106 within its wireless transmission range to form a wireless local area network (WLAN), and each of the above wireless communication devices may act as a network node of the WLAN.

In operations, the wireless communication circuit 100 and the wireless communication devices 102~106 may adopt an appropriate token passing mechanism to determine which network node has the network occupation right to occupy the network transmission. In general, the network node which has the token has the right to use the network medium to conduct data transmission. The use of token passing mechanism could maximize the bandwidth utilization of the WLAN to fully use the bandwidth of the network.

As shown in FIG. 1, the wireless communication circuit 100 comprises a physical-layer circuit 110, a micro-controller 120, a storage circuit 130, a data bus 140, and a MAC-layer circuit 150.

Figure 3:
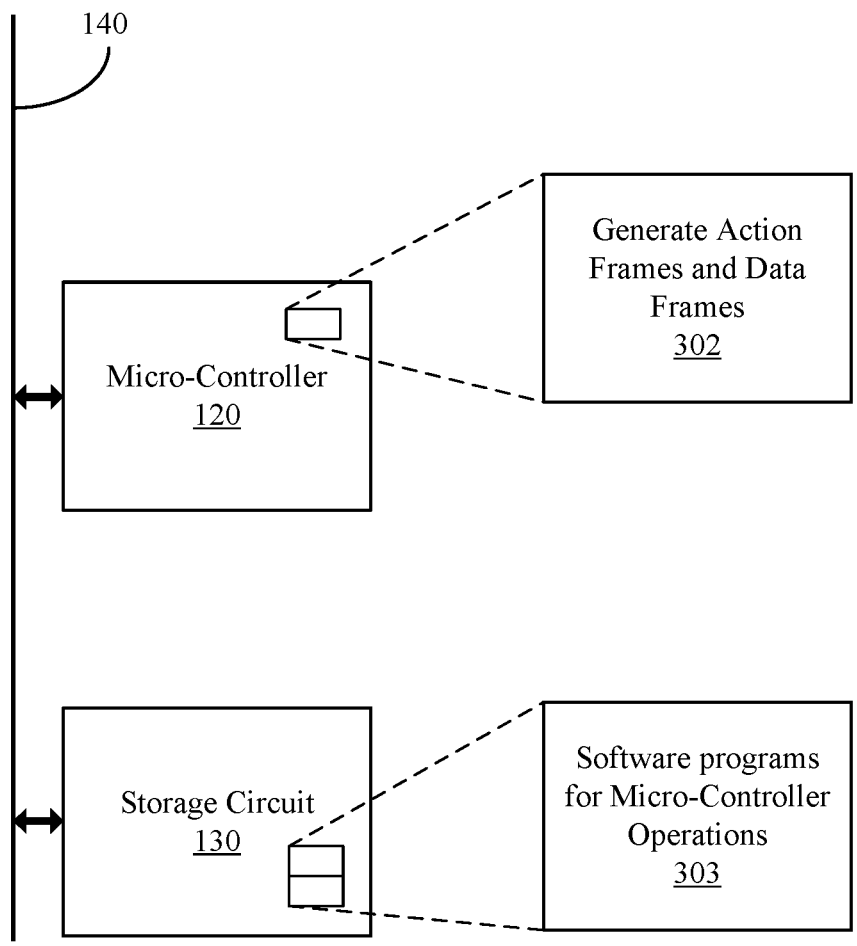
FIG. 3 is a block diagram showing the micro-controller and the storage circuit and sub-components of each.

The micro-controller 120 is arranged to operably generate data frames and corresponding action frames to be transmitted to other wireless communication devices 102~106 (FIG. 3, 302). The aforementioned action frames may include token request messages and token release messages relevant to the token passing mechanism described previously.

The storage circuit 130 is coupled with the micro-controller 120 through the data bus 140, and arranged to operably store the software programs (FIG. 3, 303) required for the operations of the micro-controller 120 and related data.

The MAC-layer circuit 150 is coupled with the micro-controller 120 through the data bus 140, and arranged to operably process the data frames and action frames generated by the micro-controller 120. The MAC-layer circuit 150 is also arranged to operably transmit the data frames and corresponding action frames to the physical-layer circuit 110 in the form of appropriate packet format at proper time points, so that the data frames and corresponding action frames can be further processed by the physical-layer circuit 110.

The physical-layer circuit 110 is coupled with the MAC-layer circuit 150, and arranged to operably convert the packets transmitted from the MAC-layer circuit 150 into appropriate analog signals, so that the resulting analog signals can be transmitted to other wireless communication devices 102~106 through the antenna 108.

In practice, each of the wireless communication devices 102~106 may be realized with various appropriate devices having wireless networking capabilities, such as a smart phone, a desktop computer, a tablet computer, a notebook computer, or the like. In addition, each of the physical-layer circuit 110, the micro-controller 120, the storage circuit 130, and the data bus 140 of the wireless communication circuit 100 may be realized with various appropriate existing circuits.

As shown in FIG. 1, the MAC-layer circuit 150 of this embodiment comprises a MAC-layer storage circuit 151, a MAC-layer control circuit 154, a scheduling circuit 155, and MAC-layer registers 156.

The MAC-layer storage circuit 151 is divided into at least two sections for respectively storing the data queue 152 and the management queue 153. The data queue 152 may further comprise a plurality of sub-queues respectively corresponding to different quality of service (QoS) requirements.

The MAC-layer control circuit 154 is coupled with the physical-layer circuit 110, the micro-controller 120, and the MAC-layer storage circuit 151. The MAC-layer control circuit 154 is arranged to temporarily store the data frames generated by the micro-controller 120 in the data queue 152, and to temporarily store the action frames generated by the micro-controller 120 in the management queue 153.

Figure 2:
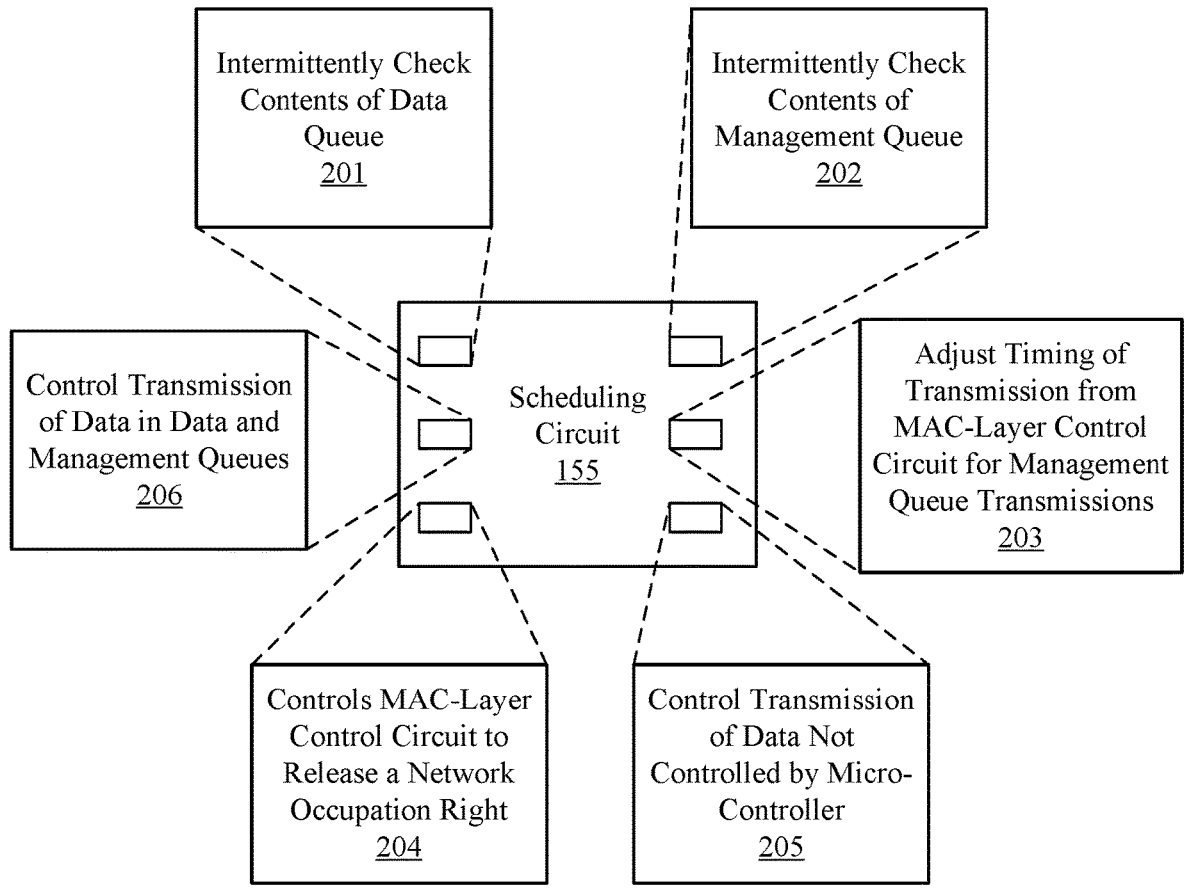
FIG. 2 is a block diagram showing the scheduling circuit and certain of its sub-components.

The scheduling circuit 155 is coupled with the MAC-layer storage circuit 151 and the MAC-layer control circuit 154, and arranged to operably control the timing that the MAC-layer control circuit 154 transmits data stored in the data queue 152 and the management queue 153 to the physical-layer circuit 110 (FIG. 2, 206).

The MAC-layer registers 156 is coupled with the MAC-layer control circuit 154 and the micro-controller 120, and arranged to operably store one or more operational status values of the MAC-layer circuit 150. During operations, the MAC-layer control circuit 154 may write the operational status of the MAC-layer circuit 150 (e.g., the data transmission speed, etc.) into the MAC-layer registers 156 in the form of appropriate data format, so that the micro-controller 120 is enabled to obtain the operational status of the MAC-layer circuit 150 by reading the contents of the MAC-layer registers 156.

In practice, each of the MAC-layer storage circuit 151, the MAC-layer control circuit 154, and the MAC-layer registers 156 of the MAC-layer circuit 150 may be realized with various appropriate existing circuits. The scheduling circuit 155 may be realized with an appropriate digital circuit having data reading and interpretation capabilities.

Additionally, different functional blocks of the aforementioned wireless communication circuit 100 may be realized with separate circuits, or may be integrated into a single circuit chip.

Please note that in the wireless communication circuit 100, the timing that the MAC-layer circuit 150 transmits related data frames and/or action frames to the physical-layer circuit 110 for further processing is not controlled by the micro-controller 120. Instead, the transmission timing of the data frames and/or action frames is controlled by the scheduling circuit 155 within the MAC-layer circuit 150.

In one embodiment, since the timing that the MAC-layer circuit 150 transmits related data frames and/or action frames to the physical-layer circuit 110 for further processing is not controlled by the micro-controller 120, relevant software programs required for the micro-controller 120 to control the above transmission timing may be omitted. That is, in this embodiment, the software programs stored in the storage circuit 130 does not contain any software program to be executed by the micro-controller 120 for controlling the timing of transmitting the data frames and the action frames to the physical-layer circuit 110.

In operations, the scheduling circuit 155 intermittently checks the contents of the data queue 152 (FIG. 2, 201) and the contents of the management queue 153 (FIG. 2, 202) to determine whether there is any data that should be transmitted to other wireless communication devices. Additionally, the scheduling circuit 155 controls the timing (FIG. 2, 203) that the MAC-layer control circuit 154 transmits the data stored in the data queue 152 and the management queue 153 to the physical-layer circuit 110 according to the determining result. For example, the scheduling circuit 155 may periodically checks the remaining amount of data to be transmitted to respective wireless communication device in the data queue 152 and the management queue 153.

If the scheduling circuit 155 determines that the data queue 152 and/or the management queue 153 contains data needed to be transmitted to a specific wireless communication device, the scheduling circuit 155 would control the MAC-layer control circuit 154 to transmit the data in the data queue 152 and/or the management queue 153 to the physical-layer circuit 110 when the wireless communication circuit 100 has the network occupation right, so that the data can be transmitted to the corresponding wireless communication device (e.g., one or more devices out of the aforementioned wireless communication devices 102~106) through the antenna 108 (FIG. 2, 203, 205).

On the contrary, if the scheduling circuit 155 determines that no data in the data queue 152 and the management queue 153 needs to be transmitted to other wireless communication devices, the scheduling circuit 155 would control the MAC-layer control circuit 154 to release a network occupation right of the wireless communication circuit 100 to other wireless communication devices before expiration of the network occupation right (FIG. 2, 204, 205).

As a result, the time that the wireless communication circuit 100 occupying the network medium can be reduced in the case that the wireless communication circuit 100 does not require to transmit data to other wireless communication devices 102~106. In this way, other wireless communication devices 102~106 are enabled to receive the occupation right of the network medium earlier than that in the conventional approach.

It can be appreciated from the foregoing descriptions that the schedule and timing of transmitting data in the data queue 152 and the management queue 153 to the physical-layer circuit 110 conducted by the MAC-layer control circuit 154 are controlled by the scheduling circuit 155, not controlled by the micro-controller 120 (FIG. 2, 205).

Therefore, the micro-controller 120 does not need to frequently read the contents of the MAC-layer registers 156, and thus the communication loading between the micro-controller 120 and the MAC-layer circuit 150 can be significantly reduced, thereby increasing the overall transmission performance of the wireless communication circuit 100.

In addition, since the scheduling circuit 155 within the MAC-layer circuit 150 is arranged to directly read and check the data stored in the data queue 152 and the management queue 153, the scheduling circuit 155 is enabled to immediately and accurately obtain the data transmission progress of the MAC-layer control circuit 154. Accordingly, the accuracy of the timing that the wireless communication circuit 100 transmits data to other wireless communication devices can be improved by utilizing the scheduling circuit 155 to control the data transmission timing of the MAC-layer control circuit 154, thereby avoiding timing mismatch between the transmitting device and the receiving device.

Please note that the circuitry structure described above is merely an exemplary embodiment, rather than a restriction to practical implementations. For example, in some embodiments, the aforementioned data bus 140 can be replaced by other appropriate data and instruction transmission mechanisms.

In another embodiment, the scheduling circuit 155 may be coupled with the MAC-layer registers 156, and arranged to operably obtain the data transmission progress of the MAC-layer control circuit 154 by reading the contents of the MAC-layer registers 156. In this situation, the scheduling circuit 155 does not require to check the contents of the data queue 152 and the management queue 153, and thus the scheduling circuit 155 needs not to be coupled with the MAC-layer storage circuit 151.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A wireless communication circuit (100), comprising:
  a physical-layer circuit (110), arranged to operably communicate with other wireless communication devices through an antenna (108);
  a micro-controller (120), arranged to operably generate data frames to be transmitted to other wireless communication devices; and
  a MAC-layer circuit (150) comprising:
    a MAC-layer storage circuit (151) including a data queue (152) configured to store data frames generated by the microcontroller (120), the storage circuit (151) further including a management queue (153) configured to store action frames generated by the microcontroller (120);
    a MAC-layer control circuit (154), coupled with the physical-layer circuit (110), the micro-controller (120), and the MAC-layer storage circuit (151), arranged to temporarily store the data frames generated by the micro-controller (120) in the data queue (152); and
    a scheduling circuit (155), coupled with the MAC-layer storage circuit (151) and the MAC-layer control circuit (154), arranged to operably schedule a timing that the MAC-layer control circuit (154) transmits data stored in the data queue (152) to the physical-layer circuit (110), wherein the scheduling circuit (155) is configured to control the transmission of data, not controlled by the micro-controller (120), so as to reduce communication loading between the micro-controller (120) and the MAC-layer circuit (150).

2. The wireless communication circuit (100) of claim 1, wherein the scheduling circuit (155) is further arranged to intermittently check contents of the data queue (152), so as to adjust a timing that the MAC-layer control circuit (154) transmits data stored in the data queue (152) to the physical-layer circuit (110).

3. The wireless communication circuit (100) of claim 1, wherein if the scheduling circuit (155) determines that no data in the data queue (152) needs to be transmitted to the physical-layer circuit (110), the scheduling circuit (155) controls the MAC-layer control circuit (154) to release a network occupation right of the wireless communication circuit (100) to other wireless communication devices before expiration of the network occupation right.

4. The wireless communication circuit (100) of claim 3, wherein the micro-controller (120) is further arranged to operably generate action frames corresponding to the data frames, and the MAC-layer control circuit (154) is further arranged to temporarily store the action frames in the management queue (153) of the MAC-layer storage circuit (151);
  wherein the scheduling circuit (155) is further arranged to intermittently check contents of the management queue (153), so as to adjust a timing that the MAC-layer control circuit (154) transmits data stored in the management queue (153) to the physical-layer circuit (110).

5. The wireless communication circuit (100) of claim 2, wherein if the scheduling circuit (155) determines that no data in the data queue (152) needs to be transmitted to the physical-layer circuit (110), the scheduling circuit (155) controls the MAC-layer control circuit (154) to release a network occupation right of the wireless communication circuit (100) to other wireless communication devices before expiration of the network occupation right.

6. The wireless communication circuit (100) of claim 5, wherein the micro-controller (120) is further arranged to operably generate action frames corresponding to the data frames, and the MAC-layer control circuit (154) is further arranged to temporarily store the action frames in the management queue (153) of the MAC-layer storage circuit (151);

wherein the scheduling circuit (155) is further arranged to intermittently check contents of the management queue (153), so as to adjust a timing that the MAC-layer control circuit (154) transmits data stored in the management queue (153) to the physical-layer circuit (110).

7. The wireless communication circuit (100) of claim 2, further comprising:
a storage circuit (130), coupled with the micro-controller (120), arranged to operably store software programs and related data required for operations of the micro-controller (120), wherein the software programs stored in the storage circuit (130) does not contain any software program for controlling the timing of transmitting the data frames and the action frames to the physical-layer circuit (110) for further processing.

8. The wireless communication circuit (100) of claim 2, wherein the MAC-layer circuit (150) further comprises:
a MAC-layer register (156), coupled with the MAC-layer control circuit (154) and the micro-controller (120), arranged to operably store operational status values of the MAC-layer circuit (150), thereby enabling the micro-controller (120) to be capable of determining the operational status of the MAC-layer circuit (150).

9. The wireless communication circuit (100) of claim 2, wherein the micro-controller (120) is further arranged to operably generate action frames corresponding to the data frames, and the MAC-layer control circuit (154) is further arranged to temporarily store the action frames in the management queue (153) of the MAC-layer storage circuit (151);

wherein the scheduling circuit (155) is further arranged to intermittently check contents of the management queue (153), so as to adjust a timing that the MAC-layer control circuit (154) transmits data stored in the management queue (153) to the physical-layer circuit (110).

10. A wireless communication circuit (100), comprising:
a physical-layer circuit (110), arranged to operably communicate with other wireless communication devices through an antenna (108);
a micro-controller (120), arranged to operably generate data frames and corresponding action frames to be transmitted to other wireless communication devices; and
a MAC-layer circuit (150) comprising:
a MAC-layer storage circuit (151) including a data queue (152) and a management queue (153), wherein the data queue (152) is configured to store data frames generated by the microcontroller (120), and the management queue (153) is configured to store action frames generated by the microcontroller (120);
a MAC-layer control circuit (154), coupled with the physical-layer circuit (110), the micro-controller (120), and the MAC-layer storage circuit (151), arranged to temporarily store the data frames generated by the micro-controller (120) in the data queue (152), and to temporarily store the corresponding action frames generated by the micro-controller (120) in the management queue (153); and
a scheduling circuit (155), coupled with the MAC-layer storage circuit (151) and the MAC-layer control circuit (154), arranged to intermittently check contents of the data queue (152) and the management queue (153), so as to operably schedule a timing that the MAC-layer control circuit (154) transmits data stored in the data queue (152) and the management queue (153) to the physical-layer circuit (110), wherein the scheduling circuit (155) is configured to control the transmission of data, not controlled by the micro-controller (120), so as to reduce communication loading between the micro-controller (120) and the MAC-layer circuit (150); and
a MAC-layer register (156), coupled with the MAC-layer control circuit (154) and the micro-controller (120), arranged to operably store operational status values of the MAC-layer circuit (150), thereby enabling the micro-controller (120) to be capable of determining the operational status of the MAC-layer circuit (150);
wherein the timing that the MAC-layer control circuit (154) transmits the data stored in the data queue (152) and the management queue (153) to the physical-layer circuit (110) is controlled by the scheduling circuit (155), not controlled by the micro-controller (120); and
if the scheduling circuit (155) determines that no data in the data queue (152) needs to be transmitted to the physical-layer circuit (110), the scheduling circuit (155) controls the MAC-layer control circuit (154) to release a network occupation right of the wireless communication circuit (100) to other wireless communication devices before expiration of the network occupation right.

\* \* \* \* \*